United States Patent [19]

Tsuboi

[11] Patent Number: 4,610,523
[45] Date of Patent: Sep. 9, 1986

[54] OPERATION CONTROL MECHANISM FOR CAMERA

[75] Inventor: Takayuki Tsuboi, Kanagawa, Japan

[73] Assignee: Canon Kabushiki Kaisha, Tokyo, Japan

[21] Appl. No.: 710,523

[22] Filed: Mar. 12, 1985

Related U.S. Application Data

[63] Continuation of Ser. No. 552,488, Nov. 16, 1983, abandoned.

[30] Foreign Application Priority Data

Nov. 17, 1982 [JP] Japan ................................ 57-202474

[51] Int. Cl.⁴ ........................... G03B 3/10; G03B 9/14
[52] U.S. Cl. .............................. 354/195.1; 354/234.1
[58] Field of Search ...................... 354/402, 403, 195.1, 354/234.1, 400

[56] References Cited

U.S. PATENT DOCUMENTS

| 4,205,906 | 6/1980 | Imura | 354/402 |
| 4,401,378 | 8/1983 | Hirohata et al. | 354/195.1 |
| 4,452,521 | 6/1984 | Hirohata et al. | 354/234.1 X |
| 4,456,360 | 6/1984 | Tamura | 354/195.1 |
| 4,466,723 | 8/1984 | Ikari et al. | 354/400 |

Primary Examiner—William B. Perkey
Attorney, Agent, or Firm—Toren, McGeady, Stanger, Goldberg & Kiel

[57] ABSTRACT

An operation mechanism for a camera which performs sequential actions by engaging with and disengaging from an electromagnetic driving member moved by an electromagnetic force is arranged to be capable of disengaging from the electromagnetic driving member by its own operating force. Therefore, the electromagnetic driving member does not require any large magnetic force for the disengagement.

30 Claims, 12 Drawing Figures

OPERATION CONTROL MECHANISM FOR CAMERA

This is a continuation of application Ser. No. 552,488, filed Nov. 16, 1983, now abandoned.

BACKGROUND OF THE INVENTION

1. Field of the Invention

This invention relates to an operation control mechanism for a camera which performs a sequential control over the camera with an electromagnetic driving member operated by an electromagnetic force.

2. Description of the Prior Art

During recent years, there have been proposed various electromagnetically operated shutters of the type having shutter blades opened and closed with an electromagnetic driving member such as a rotor or the like that is operated by an electromagnetic force generated with a current supplied to a coil disposed within a magnetic field. The above-stated electromagnetic driving member dispenses with a charging mechanism and thus permits reduction in size of a shutter mechanism. Meanwhile, recent cameras incorporate varied kinds of automatic operating mechanisms including an automatic focusing mechanism which automatically adjusts the focal point of a photo-taking lens, etc. Hence, it has become necessary to precisely perform a sequential control over these mechanisms. Therefore, as disclosed by U.S. patent application Ser. No. 279,223, now abandoned, there have been proposed some cameras that are arranged, for example, such that automatic focusing action and shutter blade opening-and-closing action are controlled one after the other according to the moving position of a control member. The moving position of the above-stated control member is detected by engaging the control member with an armature which is arranged to have its position shifted by the attraction of an electromagnet and the release therefrom. In cameras of this kind having an electromagnetic driving member and an electromagnetic operated shutter, if the electromagnetically driving member is arranged to be usable in place of the electromagnet, the electromagnetic driving member not only performs its function but also obviates the necessity of the above-stated electromagnet. This would permit reduction in size and cost.

Generally, however, the driving force of the electromagnetic driving member is weak. Therefore, if the moving position of the control member is arranged to be determined by engaging it with the electromagnetic driving member as mentioned above, disengagement between them becomes impossible. In order to solve this problem, the electromagnetic driving member must be arranged to generate a sufficiently large electromagnetic force for the disengagement. Accordingly, to attain the above-stated purpose, it becomes necessary to increase the size of a coil attached to the electromagnetic driving member and the amount of power supply thereto. Further, the increase in size of the coil necessitates an increase in the number of magnets to be used. In other words, use of a larger coil is disadvantageous not only in terms of cost but also in terms of space available within a camera which must be arranged to meet the requirement for reduction in size. Besides, such an arrangement results in an increase in power consumption and thus presents a serious problem for cameras which cannot afford use of batteries of a large capacity again because of the requirement for reduction in size.

SUMMARY OF THE INVENTION

An object of this invention is to provide an operation control mechanism for a camera wherein an operation mechanism which performs sequential actions through engagement with and disengagement from an electromagnetic driving member operated by an electromagnetic force is arranged to disengage from the electromagnetic driving member by its own operating force for the above-stated disengagement.

The above and further objects and features of the invention will become apparent from the following detailed description of preferred embodiments thereof taken in conjunction with the accompanying drawings.

DETAILED DESCRIPTION OF THE PREFERRED EMBODIMENTS

Figure 1:
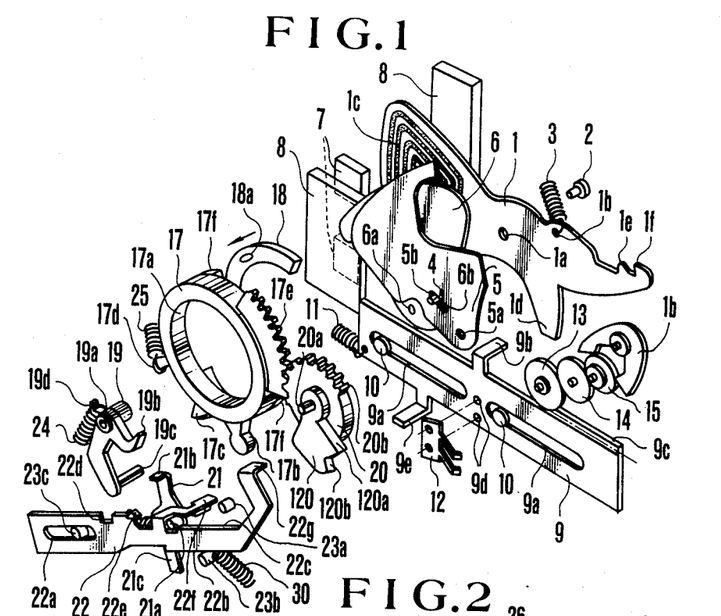
FIG. 1 is an oblique view showing an embodiment of the invention.

Referring to FIG. 1, there is shown an embodiment of the present invention which includes a rotor 1 which serves as an electromagnetic driving member pivotally mounted via a hole 1a on a pin 2 secured to a shutter base plate which is not shown. The rotor is provided with another hole 1b. A shutter blade driving pin 4 is caulked to the hole 1b. The rotor 1 is further provided with a coil pattern 1c which is formed into a helical shape; a braking part 1d which abuts on a bent-up part 9b of a set plate 9 when the rotor 1 turns clockwise; and claws 1e and 1f which are arranged to stop a distance control lever 22 from turning upward on the right-hand side as viewed on the drawing by abutting on a bent-up part 22f of the distance control lever 22. A spring 3 is arranged to urge the rotor 1 to turn counterclockwise. However, the rotor 1 comes to a stop in the position of FIG. 1 by abutting on a structural member which is not shown. When a current is supplied to the conductive coil pattern 1c of the rotor 1, the rotor turns clockwise according to the left-hand rule of Fleming against the urging force of the spring 3.

Shutter blades 5 and 6 are arranged to serve a combined function as stop blades. They are pivotally carried via holes 5a and 6a by structural members which are not shown. They are provided with slots 5b and 6b which are fitted on the above-stated blade driving pin 4. The shutter blades are thus arranged to open and close accordingly as the rotor 1 turns. In this embodiment, the shutter blades 5 and 6 overlap each other to a great extent under the condition shown in the drawing. Under this condition, a film will not be exposed to light before the clockwise turning movement of these blades comes to exceed a certain extent. Permanent magnets 7 are carried by a shutter base plate which is not shown and are arranged to form a magnetic field perpendicularly to the coil pattern 1c in conjunction with yokes 8 which are disposed on both sides of the rotor 1.

The set plate 9 is arranged to be movable to the right as viewed on the drawing by a winding mechanism which is not shown against the urging force of a spring 11. A locking member which is not shown locks the set plate 9 in a charged position as shown in FIG. 1. The set plate 9 has a slot 9a engaged with a supporting shaft 10 which is secured to the camera body and is thus arranged to be slidable to the left and right as viewed in the drawing. In addition to the above-stated bent-up part 9b and the slot 9a, the set plate 9 is provided with a rack 9c which engages a governor gear 13; a hole 9d for carrying a count contact piece 12 which slides over a pattern (not shown) to produce to a circuit (not shown) a start signal relative to the set plate 9, an intermediate signal, a count signal for an exposure control circuit, a signal indicative of completion of the travel of the set plate, etc. and another bent-up part 9e which is arranged to abut on one end 21c of a lens barrel connecting lever 21. A governor mechanism composed of speedup gears 13, 14, an escape wheel 15 and an anchor 16 is rotatably carried by a structural member of the camera body which is not shown. The governor mechanism is arranged to make constant the speed of operation of the set plate 9 which is caused by the urging force of the spring 11.

A distance ring 17 is pivotally carried by a lens barrel base plate which is not shown via a hole 17a. The distance ring 17 is urged to turn clockwise by a spring 25 which is attached to a hook part 17d thereof. However, the ring 17 is kept in repose in the state as shown in the drawing by the engagement of its claw 17c with a claw 19b of a stop lever 19. In the distance ring 17, a charging part 17b is arranged to engage a charging lever which is not shown and thereby to charge the distance ring 17 to a state as shown in the drawing in response to a winding action in the same manner as in the case of the set plate 9. A gear part 17e of the ring 17 engages the gear part 20b of a stop wheel 20 and is arranged to transmit the turning movement of the ring 17 to the wheel 20. Cams 17f of the ring 17 are arranged to move a photo-taking lens according to the rotation of the distance ring 17. The projections 18a of a member 18 which forms a part of the lens barrel are pushed by a spring which is not shown against the three cams 17f. The member 18 moves in the direction of an optical axis to move the lens according to the turning degree of the ring 17 in the direction of the arrow shown in the drawing.

A stop lever 19 is rotatably carried by the lens barrel base plate (not shown) via a hole 19a and is urged to turn in the counterclockwise direction by the urging force of a spring 24. However, under the condition as shown in FIG. 1, the stop lever 19 is in repose in the position shown with a stopper (not shown) abutting thereon. The stop lever 19 is provided with a claw 19b for stopping the distance ring 17; and a driving pin 19c which abuts on one end (not shown) of the set plate 9 when the set plate 9 moves to a predetermined position from the condition of FIG. 1. The driving pin 19c then causes the stop lever 19 to turn clockwise and thus disengages the claw 19b of the stop lever 19 from the claw 17c of the distance ring 17. The above-stated stop wheel 20 is rotatably carried by a shaft 20a and is gear coupled with the distance ring 17 via a gear part 20b thereof. The stop wheel 20 is provided with a cam 120, which is coaxially secured to the former. The cam 120 is provided with cam faces 120a and 120b. When the stop wheel 20 turns counterkockwise, a bent-up part 22g of a distance control lever 22 comes to abut upon these cam faces 120a and 120b.

The connecting lever 21 is pivotally carried by a structural member (not shown) via a hole 21a thereof. The connecting lever 21 has a bent-up part 21b which is arranged to abut on a notch 22d of the distance control lever 22; and an arm part 21c which abuts on the bent-up part 9e of the set plate 9. The above-stated distance control lever 22 is slidably carried via a slot 22a by supporting shafts 23a, 23b and 23c which are arranged in one unified body with the camera body. The lever 22 is also arranged to be swingable on the supporting shaft 23c. Under the condition as shown in FIG. 1, one side face 22b of the lever 22 abuts on the shaft 23b and the lever 22 is thus prevented from turning clockwise. The supporting shaft 23a is arranged to prevent the distance control lever 22 from turning counterclockwise. However, under the condition of FIG. 1, the supporting shaft 23a stays away from another side face 22c of the lever 22. Further, the distance control lever 22 is provided with a bent-up part 22f which is arranged to engage the claw 1e or 1f of the rotor 1 when the lever 22 is moved to the right as viewed on the drawing being guided by the supporting shafts 23b and 23c. The direction in which this bent-up part 22f comes to engage the claw 1e or 1f of the rotor 1 is approximately perpendicular to the turning direction of the rotor 1.

The distance control lever 22 is urged to move to the right as viewed onthe drawing by a spring 30. When the notch 22d of the distance control lever 22 is disengaged from the bent-up part of the connecting lever 21, this spring 30 causes the lever 22 to move along the supporting shafts 23b and 23c and also urges the lever 22 to turn clockwise on the shaft 23c. The spring 30 is attached to a hook 22e of the lever 22. Further, when the stop wheel 20 turns with the bent-up part 22g of the lever 22 in a state of engaging the cam face 120a or 120b of the cam 120, the lever 22 turns counterclockwise to disengage its bent-up part 22f from the claw 1e or 1f of the rotor 1.

Figure 2:
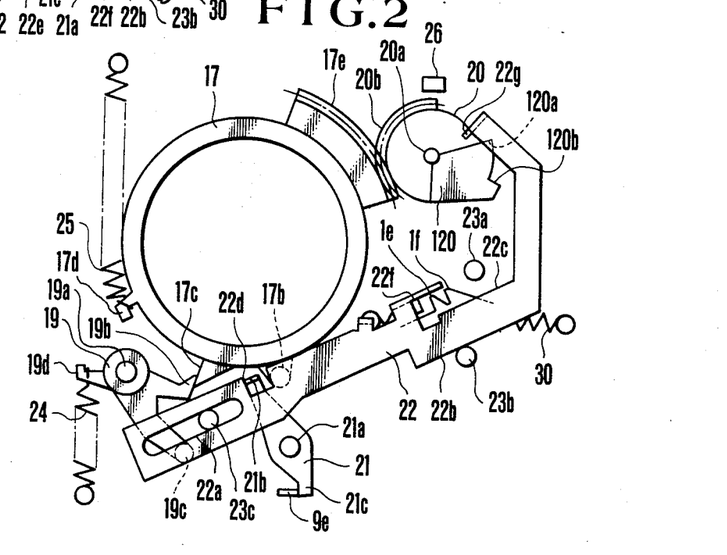
FIG. 2 is a plan view showing the same embodiment after having completed a charging process.
Figure 8:
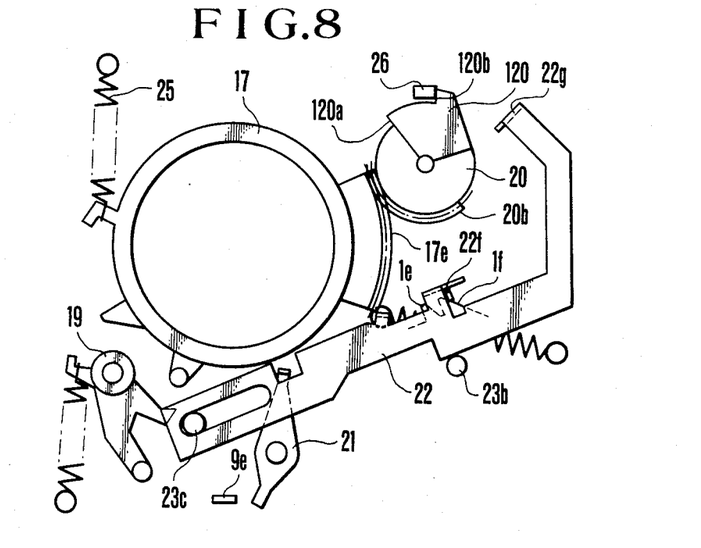
FIG. 8 is a plan view showing this embodiment after having completed the focusing action when an object to be photographed is located at a short distance from the camera.

Referring to FIG. 2, the embodiment includes a stopper 26 for a short distance which is arranged in one unified body with a structural member. When the bent-up part 22g of the distance control lever 22 comes outside of the locus of the cam faces 120a and 120b of the cam 120, the cam face 120b abuts on the stopper 26 as shown in FIG. 8. With the cam face 120b of the cam 120 abutting on the short distance stopper 26 in this manner, the photo-taking lens is in a state of having been moved into a short distance position.

In the operation of the invention, upon completion of a charging process, the embodiment shown in FIG. 1 is in the state shown in FIG. 2. With the camera in this charged state, when a photographer directs the camera to an object to be photographed and pushes a shutter release button down to a first stroke position of the button, information on a distance to the object obtained by a known distance measuring arrangement is stored in the focusing circuit of the camera. Following this, when the photographer further pushes the release button down to a second stroke position, the set plate 9 is unlocked. The urging force of the spring 11 causes the set plate 9 to move from its charge completion position of FIG. 1 to the left at a constant speed. The bent-up part 9e also moves to the left from its position shown in FIG. 2 as viewed on the drawing. The count contact piece 12 slides over the pattern to inform the focusing circuit of the commencement of the movement of the set plate 9. Then, a focusing action begins.

Figure 3:
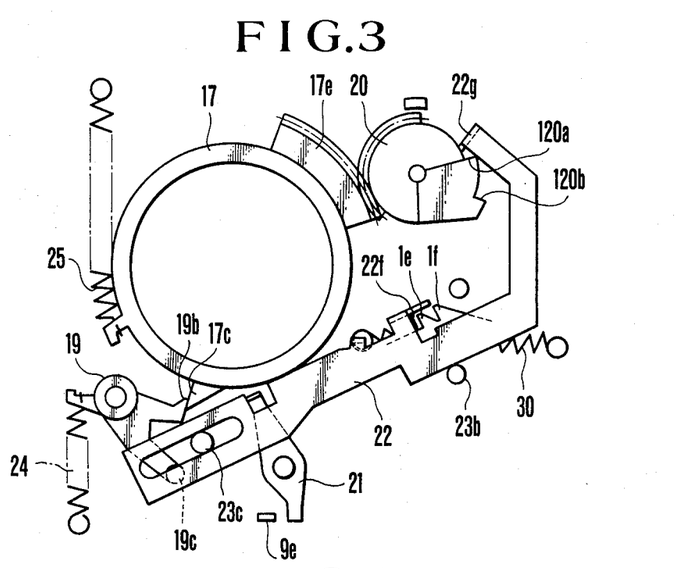
FIGS. 3 and 4 are plan views showing this embodiment in varied states.
Figure 10:
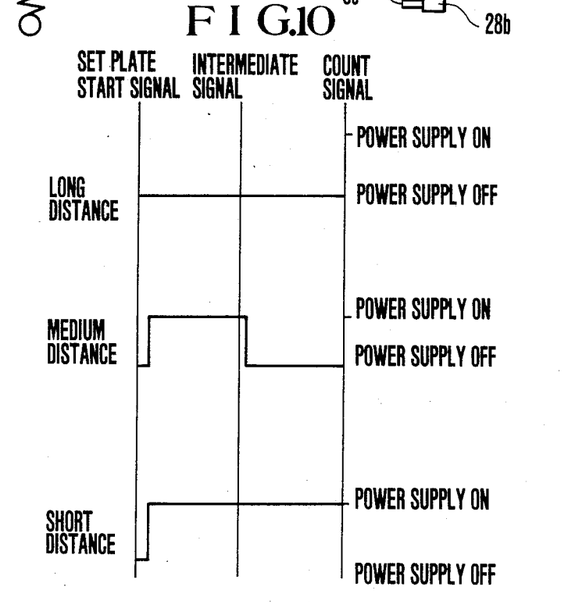
FIG. 10 is a timing chart showing timing for power supply to a coil during a focusing action.

The operation of the embodiment will be described separately for three different cases where the object to be photographed is located at a long distance, at a medium distance and at a short distance from the camera. Referring to FIG. 10, when the object is located at a long ditance, power supply is not effected to the rotor 1 when a set plate start signal is produced as mentioned in the foregoing. Therefore, the rotor 1 remains in the position of FIG. 2 even after the set plate 9 begins to move. The distance control lever 22 on the other hand is released from the restriction imposed by the connecting lever 21 by the travel of the set plate 9. The urging force of the spring 30 then causes the distance control lever 22 to move in the right upward direction as viewed on the drawing until its bent-up part 22f comes to abut on the claw part 1e of the rotor 1. This condition is as shown in FIG. 3.

In this instance, the bent-up part 22f of the distance control lever 22 engages the claw 1e of the rotor 1 in a direction almost perpendicular to the rotating direction of the rotor 1. Therefore, this engagement prevents the rotor 1 from turning. Further, in this instance, the bent-up part 22g of the distance control lever 22 is kept in a position to be engageable with the cam face 120a of the cam 120.

Figure 4:
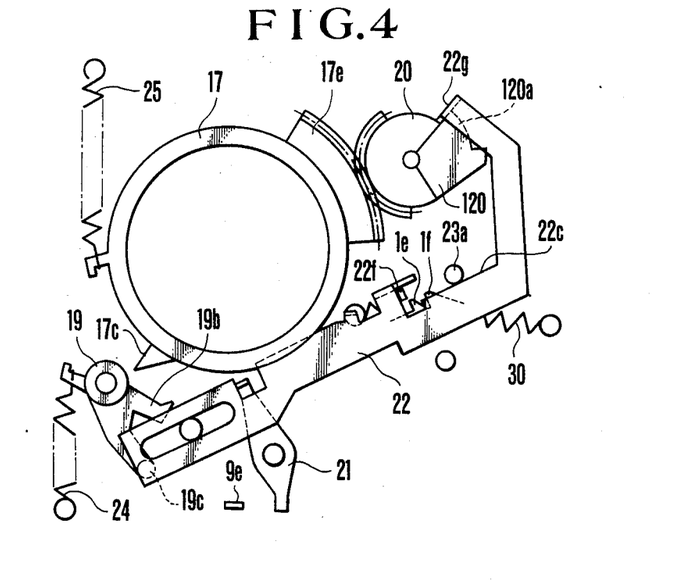
Figure 5:
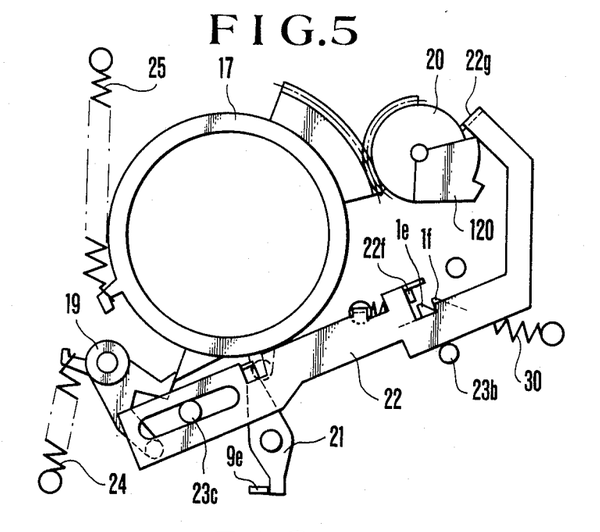
FIGS. 5, 6 and 7 are plan views respectively showing this embodiment in varied states during a focusing action.

After that, further movement of the set plate 9 to the left as viewed on the drawing causes the driving pin 19c of the stop lever 19 to be pushed by one end of the set plate 9. As a result, the stop lever 19 turns clockwise to disengage its claw part 19b from the claw 17c of the distance ring 17. Accordingly, the distance ring 17 is then caused by the urging force of the spring 25 to begin to turn clockwise. The clockwise turn of the distance ring 17 moves the photo-taking lens and also causes via its gear part 17e the stop wheel 20 to turn counterclockwise. The turn of the stop wheel 20 results in a counterclockwise turn of the cam 120. The cam face 120a comes to abut on the bent-up part 22g of the distance control lever 22. This causes the lever 22 to turn on the supporting shaft 23c until its side face 22c comes to abut on the supporting shaft 23a as shown in FIG. 4.

As a result of this, the claw 1e of the rotor 1 is disengaged from the bent-up part 22f of the distance control lever 22 and the rotor 1 thus becomes free to turn. With the side face 22c of the distance control lever 22 abutting on the supporting shaft 23a, the distance ring 17 is stopped via the stop wheel 20 from turning. Therefore, the photo-taking lens is also stopped from moving. In this instance, the photo-taking lens is set in a long distance position.

Following that, the switch-over of circuits is effected by the movement of the count contact piece 12 which takes place accordingly as the set plate 9 moves. The exposure control circuit then begins to control power supply to the coil pattern 1c of the rotor 1. With power supply effected to the coil pattern 1c, the rotor 1 turns clockwise against the urging force of the spring 3. The braking part 1d of the rotor 1 comes to abut on the bent-up part 9b of the set plate 9.(See FIG. 1) At that time, the shutter blades 5 and 6 remain overlapping each other and the film has not yet begun to be exposed.

Then, the rotor 1 turns clockwise according to the travel of the set plate 9 and thus begins to open the shutter blades 5 and 6. The exposure control circuit detects a correct exposure of the film in a known manner and stops power supply to the coil pattern 1c. Then, the rotor 1 is caused by the urging force of the spring 3 to turn counterclockwise and to perform a closing action on the shutter blades 5 and 6. Further, the set plate 9 keeps on moving even after completion of the exposure-effecting action to shift a motor power supply switch (not shown) for effecting power supply to a motor before the set plate 9 comes to a stop. With the motor switch shifted in this manner, the motor which is not shown operates to wind up the film in a known manner. Meanwhile, via a charging mechanism which is not shown, the set plate 9 and the distance ring 17 are charged. With the set plate 9 charged, the distance control lever 22 is also charged via the connecting lever 21 and comes back to its original position. Following that, power supply to the motor is brought to a stop by a known method. The whole system of the embodiment then comes back to the state of FIG. 1 with the operation completed.

Figure 11:
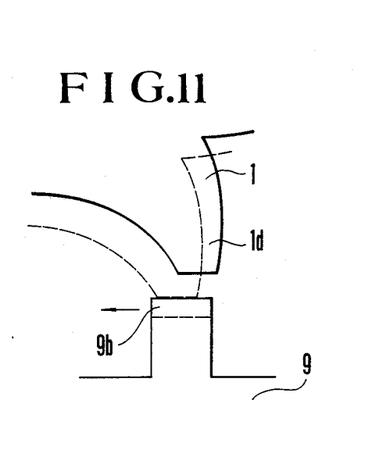
FIG. 11 is an illustration of the operation of a rotor performed when the object is located at a medium or short distance from the camera.
Figure 12:
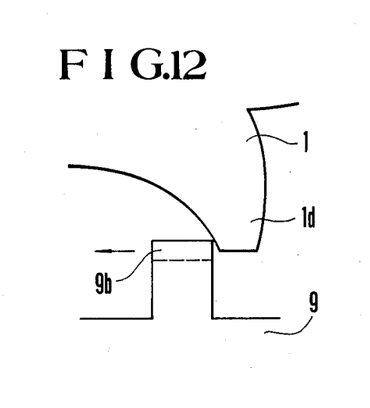
FIG. 12 is an illustration of the operation of the rotor performed for an exposure action.

In the case where the object is located at a medium distance, the set plate 9 is unlocked from the charged position shown in FIGS. 1 and 2. With the set plate 9 thus allowed to move, the count contact piece 12 slides over the pattern (not shown) to supply the set plate start signal to the focusing circuit. In this case, the focusing circuit produces a rotor power supply signal on the basis of the set plate start signal and a medium distance signal as shown in FIG. 10. Then, power supply is effected to the coil 1c of the rotor 1. This causes the rotor 1 to turn clockwise until the braking part 1d of the rotor comes to abut on the upper part of the bent-up part 9b of the set plate 9. Referring to FIG. 11, with the braking part 1d abutting on the upper part of the bent-up part 9b, the rotor is allowed to turn only to a limited extent irrespective of the continuous travel of the set plate 9. This is because the automatic focusing action has not at this stage been completed and the shutter blades 5 and 6 must be prevented from being opened by the rotation of the rotor 1 until the rotor 1 is allowed to resume its rotation. At the time of an exposure, the set plate 9 travels further and the braking part 1d follows the set plate 9 to permit the rotor to turn for opening the shutter blades 5 and 6.

While the braking part 1d of the rotor 1 is coming to abut on the bent-up part 9b of the set plate 9 as mentioned in the foregoing, the claws 1e and 1f of the rotor 1 move out of the reach of the bent-up part 22g of the distance control lever 22.

Figure 6:
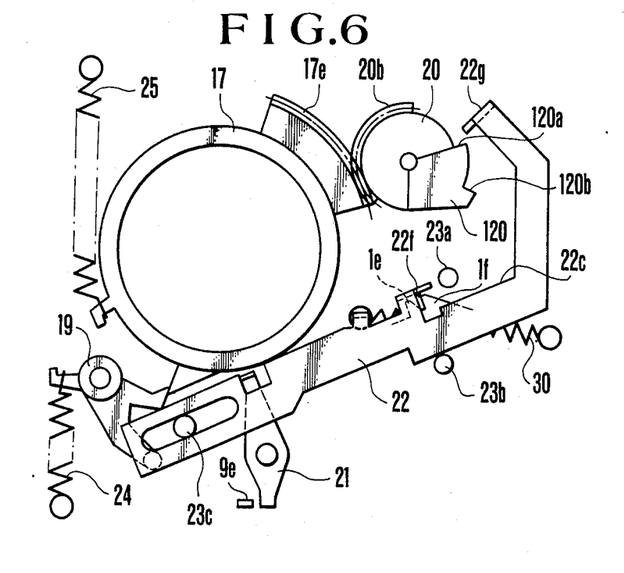

Under this condition, the set plate 9 causes the distance control lever 22 to slide in the right upward direction in the same manner as in the instance described in the foregoing. When the bent-up part 22f of the distance control lever 22 comes beyond the claw 1e of the rotor 1, the pattern over which the count contact piece 12 is sliding in one unified body with the set plate 9 supplies an intermediate signal to the focusing circuit. The focusing circuit then produces a signal for stopping power supply to the coil 1c on the basis of the medium distance signal and the intermediate signal. The power supply to the coil 1c is cut off accordingly. With the power supply cut off, the rotor 1 is brought back to the position of FIG. 1 by the urging force of the spring 3. After that, the bent-up part 22f of the distance control lever 22 which slides in the right upward direction comes to abut on the claw 1f of the rotor 1 and there obtains a condition as shown in FIG. 6, in which the bent-up part 22g of the lever 22 is located within the operating reach of the cam face 120b of the cam 120.

Figure 7:
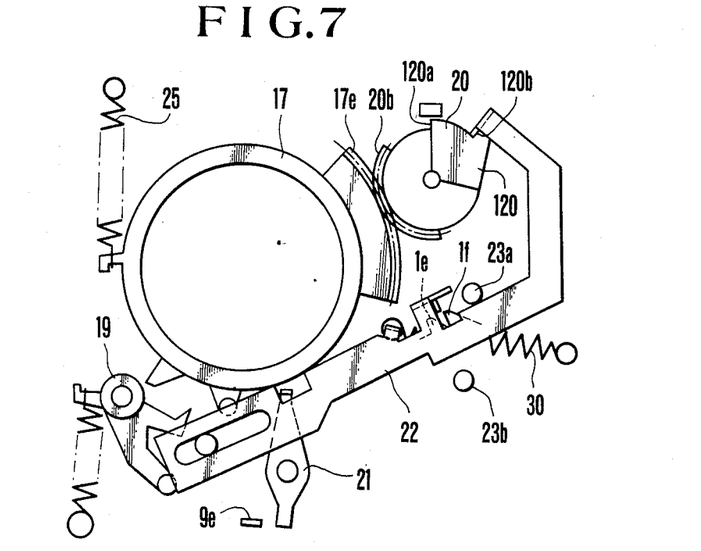

The set plate 9 further travels and turns the stop lever 19 as mentioned in the foregoing to disengage it from the distance ring 17. The distance ring 17 is then allowed to begin to turn. As a result of that, the cam 120 turns counterclockwise in one unified body with the stop wheel 20. The cam face 120b comes to engage the bent-up part 22g of the distance control lever 22 and causes the lever 22 to turn counterclockwise until the side face 22c comes to abut on the supporting shaft 23a. This condition is as shown in FIG. 7. Under this condition, the photo-taking lens is moved to a medium distance position. The rest of the operation after that is identical with the operation described in the foregoing for a long distance and, therefore, requires no further description.

In the case of a short distance, the operation is similar to the operation for a medium distance up to a point where the above-stated intermediate signal is supplied to the focusing circuit. However, since a short distance signal is also supplied in this case, the focusing circuit does not produce a signal for stopping power supply to the coil in response to the intermediate signal. Therefore, the power supply to the coil 1c becomes as shown in FIG. 10. The bent-up part 22f of the distance control lever 22 passes through the second claw 1f of the rotor 1 and the bent-up part 22g of the lever 22 is moved away from the operating area of the cam face 120b of the cam 120 as shown in FIG. 8. Further, in the same manner as the operation described in the foregoing, the braking part 1d of the rotor also remains abutting on the upper part of the bent-up part 9b of the set plate 9 until completion of the automatic focusing action to inhibit further rotation of the rotor 1. Therefore, the shutter blades 5 and 6 never open during this period. When the distance ring 17 disengages to allow the stop wheel 20 to turn, the cam face 120b of the cam 120 comes to abut on the short distance stopper 26. The phototaking lens is, therefore, set in a short distance position. After that, the opening action is performed on the shutter blades 5 and 6 in the same manner as described in the foregoing.

Figure 9:
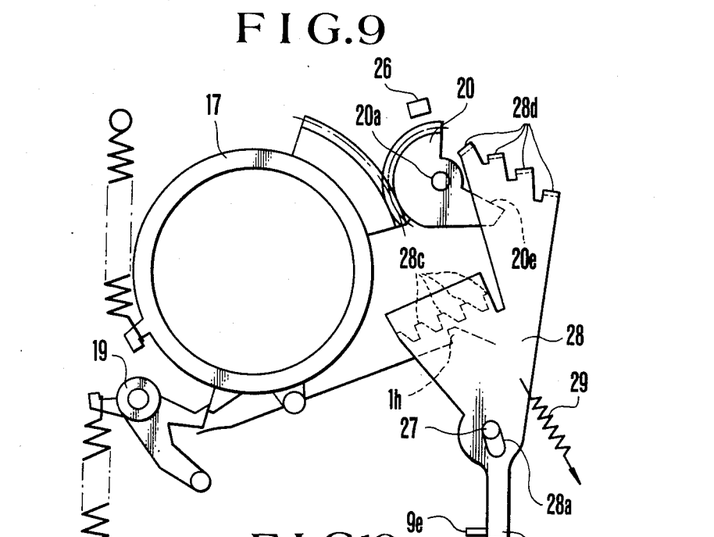
FIG. 9 is a plan view showing another embodiment of the invention.

Another embodiment of the invention is arranged as shown in FIG. 9, in which the same parts as those of the preceding embodiment are indicated by the same reference numerals and symbols. In this embodiment, the stop wheel 20 is provided with a locking piece 20e which is arranged to perform a function similar to that of the cam faces 120a and 120b mentioned in the foregoing. While the preceding embodiment is arranged to perform three-zone focusing, the embodiment shown in FIG. 9. is arranged to perform five-zone focusing. The embodiment includes a distance control lever 28 which is arranged to turn clockwise in one unified body with the bent-up part 9e of the set plate 9 when the bent-up part 9e moves to the left as viewed in the drawing, as the set plate 9 moves. The distance control lever 28 pivotally engages a shaft 27 of the base plate via a slot 28a provided in the lever 28. The shaft 27 is normally caused to abut on the upper side of the slot 28a by the force of a spring 29. The rotor 1 is provided with a claw 1h, which is arranged to perform a function similar to that of the claws 1e and 1f mentioned in the foregoing by engaging a distance adjustment cam 28c of the distance control lever 28. The distance control lever 28 is further provided with bent-up parts 28d which restrict the turning extent of the locking piece 20e of the stop wheel 20 according to the turning extent of the lever 28.

FIG. 9 shows the embodiment with power supply delivered to the coil 1c of the rotor 1 and the travel of the set plate 9 having begun from its initial position. Under this condition, when the power supply to the coil 1c is stopped by a signal representing a measured distance to an object and the position signal representing the position of the set plate 9, the rotor 1 turns counterclockwise from the position of FIG. 9 to cause the locking pawl 1h to engage into one of recesses of the distance adjustment cam of the distance control lever 28. The clockwise rotation of the distance control lever 28 is restricted by this. One of the bent-up parts 28d corresponding to the measured object distance signal then comes within the operating area of the locking piece 20e of the stop wheel 20. Following that, when the distance ring 17 is released from being locked by the stop lever 19, the stop wheel 20 turns counterclockwise according to the shifting extent of the photo-taking lens. Then, the locking piece 20e of the stop wheel 20 comes to abut on the above-stated one of the bent-up parts 28d. This causes the distance control lever 28 to move upward as viewed on the drawing until the lower side of the slot 28a comes to abut on the supporting shaft 27. With the lower side of the slot 28a thus engaging the shaft 27, the distance ring 17 is inhibited from turning further and thus stops the photo-taking lens in an in-focus position. The upward movement of the distance control lever 22 disengages the claw 1h of the rotor 1 from the cam 28c to make the rotor 1 free to turn thereafter.

The rest of the operation and other details of the arrangement of this embodiment are similar to those of the preceding embodiment and require no further description.

While, in the embodiment described above, an electromagnetic driving member is used for performing sequential control over the automatic focusing operation and the exposure effecting operation, the present invention is not limited to the arrangement of these embodiments. The invention is applicable to other mechanisms so long as such sequential control is arranged to be accomplished by means of the electromagnetic driving member. Further, in accordance with the invention, the electromagnetic driving member does not have to be arranged to form an electromagnetically operated shutter.

In accordance with the invention, as described in the foregoing, the operation mechanism of a camera which performs sequential actions by engaging with and disengaging from an electromagnetic driving member is arranged to be capable of disengaging from the electromagnetic driving member by its own operating force. Therefore, the electromagnetic driving member does not require a large force for the above-stated disengagement. This permits reduction in the size of the coil, etc. to be attached to the electromagnetic driving member and obviates the necessity of supplying a large current. The invention is, therefore, highly advantageous for reduction in size and cost of a camera.

What I claim:

1. A camera having an electromagnetically operated shutter which is arranged to open and close shutter blades by the reciprocating motion of a rotor, said camera comprising:
(a) a distance control member which is arranged to move in a first direction approximately perpendicular to the rotating direction of said rotor and is engageable with said rotor, the moving extent of said distance control member in said first direction being determined by the engaging position between the distance control member and said rotor; and
(b) lens shifting means for controlling the shifting extent of said lens according to the moving extent in said first direction of said distance control member, so as to adjust the focal point of a photo-taking lens, said lens shifting means being arranged to shift its position following the shift of said photo-taking lens and to disengage said distance control member from said rotor when said lens shifting means moves.

2. A camera according to claim 1, wherein said lens shifting means is provided with an elastic member which serves as a drive source.

3. A camera according to claim 2, wherein said distance control member is movable also in a second direction approximately in parallel with the rotating direction of said rotor; and said lens shifting means is arranged to disengage the distance control member from the rotor by moving the distance control member in said second direction.

4. An operation control device for a camera, comprising:
(a) electromagnetic drive means for causing first and second operations related to effecting an exposure to be carried out by electromagnetic force;
(b) operating means arranged to engage said electromagnetic drive means when the first operation of said electromagnetic drive means is initiated, and to operate in a manner determined by the relative position thereof; and
(c) release means for disengaging said electromagnetic drive means from said operating means after the manner of operation of said operating means has been determined by engagement with said electromagnetic drive means, whereby said electromagnetic drive means after having been released from engagement with said operating means carries out the second operation.

5. A device according to claim 4, wherein the first operation by said electromagnetic drive means includes focusing adjustment.

6. A device according to claim 5, wherein said operating means includes stopping means for locating a photographic optical system in an in-focus position, whereby the stopped position of said photographic optical system by said stopping means is determined by the relative position of said operating means to said electromagnetic drive means when in engagement.

7. A device according to claim 6, wherein said electromagnetic drive means is arranged to vary the relative position to said operating means when in engagement with a variation in the distance to an object to be photographed.

8. A device according to claim 7, wherein said release means includes a drive source for moving the photographic optical system to the in-focus position, whereby said electromagnetic drive means is disengaged from said operating means by the driving power of said drive source.

9. A device according to claim 8, wherein said release means is arranged to move said operating means as the photographic optical system is driven to move, whereby said electromagnetic drive means is released from engagement with said operating means.

10. A device according to claim 9, wherein the second operation by said electromagnetic drive means includes an operation for exposure.

11. A device according to claim 10, further comprising:
shutter blades arranged to open and close in response to the second operation by said electromagnetic drive means.

12. An operation control device for a camera, comprising:
(a) operating means for carrying out an operation related to effecting an exposure;
(b) control means for controlling the operation of said operating means; and
(c) electromagnetic drive means for carrying out first and second operations related to making an exposure by electromagnetic force, whereby said electromagnetic drive means is engaged with said control means by said first operation and determines the manner in which said control means is to operate, and said control means is released from engagement with said electromagnetic drive means by the driving power of said operating means, before said electromagnetic drive means carries out said second operation.

13. A device according to claim 12, wherein the first operation of said electromagnetic drive means includes an operation for focusing adjustment.

14. A device according to claim 13, wherein said operating means includes a drive source for driving motion of a photographic optical system to an in-focus position.

15. A device according to claim 14, wherein said drive source includes bias means.

16. A device according to claim 14, wherein said control means includes stopping means for locating the photographic optical system in an in-focus position.

17. A device according to claim 16, wherein said electromagnetic drive means is arranged to determine the manner of operation of said control means depending on a distance to an object to be photographed.

18. A device according to claim 17, wherein said operating means moves said control means as the photographic optical system moves to the in-focus position, whereby said control means is released from engagement with said electromagnetic drive means.

19. A device according to claim 18, wherein the second operation of said electromagnetic drive means includes an operation for effecting an exposure of film.

20. A device according to claim 19, further comprising:
shutter blades arranged to open and close in response to the second operation of said electromagnetic drive means.

21. An operation control device for a camera, comprising:
(a) electromagnetic drive means arranged to change its position by electromagnetic force, whereby as its position changes, said electromagnetic drive means carries out first and second operations related to effecting an exposure;
(b) operating means arranged to engage with said electromagnetic drive means when the first operation occurs, whereby the manner of operation of said operating means is determined and whereby said operating means comes to engage with said electromagnetic drive means from a direction almost perpendicular to the direction of displacement of said electromagnetic drive means; and (c) release means for disengaging said electromagnetic drive means from said operating means after the manner of operation of said operating means has been determined by engagement with said electromagnetic drive means, whereby said electromagnetic drive means after having been released from engagement with said operating means by said release means carries out the second operation.

22. A device according to claim 21, wherein said operating means includes drive means by which said operating means is able to change its position in a direction to engage with said electromagnetic drive means.

23. A device according to claim 22, wherein said drive means includes bias means.

24. A device according to claim 22, wherein the first operation of said electromagnetic drive means includes an operation for focusing adjustment.

25. A device according to claim 24, wherein said operating means includes stopping means for locating a photographic optical system in an in-focus position, whereby the stopped position of the photographic optical system is determined by the manner of engagement between said operating means and said electromagnetic drive means.

26. A device according to claim 25, wherein said electromagnetic drive means is arranged to vary the manner of engagement with said operating means with a variation in the distance to an object to be photographed.

27. A device according to claim 26, wherein said release means includes a drive source for moving the photographic optical system to the in-focus position, whereby said electromagnetic drive means is disengaged from said operating means by the driving power of said drive source.

28. A device according to claim 27, wherein said release means is arranged to move said operating means as the photographic optical system is driven to move, whereby said electromagnetic drive means is released from engagement with said operating means.

29. A device according to claim 28, wherein the second operation by said electromagnetic drive means includes an operation for exposure.

30. A device according to claim 29, further comprising:

shutter blades arranged to open and close in response to the second operation by said electromagnetic drive means.

* * * * *